(12) United States Patent

Yamada et al.

(10) Patent No.: US 11,143,134 B2
(45) Date of Patent: Oct. 12, 2021

(54) ENGINE CONTROLLER, ENGINE CONTROL METHOD, AND MEMORY MEDIUM (71) Applicant: TOYOTA JIDOSHA KABUSHIKI KAISHA, Toyota (JP)

(72) Inventors: Takafumi Yamada, Okazaki (JP); Shunsuke Kurita, Mie-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/917,982

(22) Filed: Jul. 1, 2020

(65) Prior Publication Data

US 2021/0054801 A1 Feb. 25, 2021

(30) Foreign Application Priority Data

Aug. 23, 2019 (JP) .............................. JP2019-152622

(51) Int. Cl.
*F02D 41/32* (2006.01)
*F02D 41/22* (2006.01)
(Continued)

(52) U.S. Cl.
CPC .......... *F02D 41/32* (2013.01); *F02D 41/0002* (2013.01); *F02D 41/18* (2013.01); *F02D 41/182* (2013.01); *F02D 41/222* (2013.01); *F02D 41/34* (2013.01); *F02D 2041/286* (2013.01); *F02D 2200/0404* (2013.01); *F02D 2200/0406* (2013.01); *F02D 2200/0414* (2013.01); *F02D 2200/101* (2013.01)

(58) Field of Classification Search
CPC ...... F02D 41/18; F02D 41/185; F02D 41/187; F02D 41/222; F02D 2200/0402; F02D 2200/0404; F02D 2200/0406; F02D 2400/08; G01F 1/72
See application file for complete search history.

(56) References Cited

U.S. PATENT DOCUMENTS 4,155,332 A * 5/1979 Yaegashi ................. F02D 41/26
123/478
4,275,694 A * 6/1981 Nagaishi ................... G01F 1/86
123/463
(Continued)

FOREIGN PATENT DOCUMENTS

EP 0 575 635 A1 12/1993
JP 1-265122 A 10/1989
(Continued)

*Primary Examiner* — John M Zaleskas
(74) *Attorney, Agent, or Firm* — Oblon, McClelland, Maier & Neustadt, L.L.P.

(57) ABSTRACT

An engine controller is provided. A second calculation process calculates an intake air amount without using an output of an air flow meter. A second determination process determines whether an intake air pulsation in an intake passage is great without using the output of the air flow meter. When the intake air pulsation is determined to be great by at least one of a first determination process and the second determination process, a calculation method switching process selects the calculated value of the intake air amount obtained by the second calculation process as a calculated value of the intake air amount used to determine an operation amount of an actuator.

8 Claims, 5 Drawing Sheets

(51) Int. Cl.
  *F02D 41/00* (2006.01)
  *F02D 41/18* (2006.01)
  *F02D 41/34* (2006.01)
  *F02D 41/28* (2006.01)

(56) References Cited

U.S. PATENT DOCUMENTS

| | | | | |
|---|---|---|---|---|
| 4,320,650 A * | 3/1982 | Kita | ............... | G01F 1/3272 73/195 |
| 4,386,520 A * | 6/1983 | Nagaishi | ............... | G01F 1/3272 73/114.35 |
| 4,599,694 A * | 7/1986 | Aposchanski | ............... | F02D 41/26 701/103 |
| 4,644,474 A * | 2/1987 | Aposchanski | ............... | F02D 41/263 123/494 |
| 4,664,090 A * | 5/1987 | Kabasin | ............... | F02D 41/2422 123/478 |
| 4,736,302 A * | 4/1988 | Kinugawa | ............... | F02D 41/263 701/103 |
| 4,736,725 A * | 4/1988 | Iwaki | ............... | F02D 41/18 123/480 |
| 4,773,375 A * | 9/1988 | Okino | ............... | F02D 41/04 123/488 |
| 4,945,883 A * | 8/1990 | Ono | ............... | F02D 41/187 123/480 |
| 5,008,824 A * | 4/1991 | Clark | ............... | F02D 41/18 701/103 |
| 5,241,857 A * | 9/1993 | Schnaibel | ............... | F02D 41/187 73/114.34 |
| 5,537,981 A * | 7/1996 | Suedholt | ............... | F02D 41/187 123/478 |
| 5,549,080 A * | 8/1996 | Uchikawa | ............... | F02D 13/0234 123/90.16 |
| 6,349,592 B1 * | 2/2002 | Hirasawa | ............... | F01L 9/20 73/114.33 |
| 6,671,613 B2 * | 12/2003 | Stotsky | ............... | F02D 41/1401 123/480 |
| 6,748,313 B2 * | 6/2004 | Li | ............... | F02D 41/18 701/102 |
| 7,096,723 B2 * | 8/2006 | Kienzle | ............... | F02D 41/182 73/114.34 |
| 7,451,754 B2 * | 11/2008 | Yasui | ............... | F02D 13/0238 123/681 |
| 2002/0166539 A1 * | 11/2002 | Gaessler | ............... | F02D 13/0207 123/404 |
| 2003/0070494 A1 * | 4/2003 | Kanke | ............... | G01F 1/698 73/861.19 |
| 2003/0230277 A1 * | 12/2003 | Muto | ............... | F02D 41/18 123/308 |
| 2004/0129249 A1 * | 7/2004 | Kondo | ............... | F02D 35/023 123/346 |
| 2005/0065707 A1 * | 3/2005 | Kaga | ............... | F02D 41/182 701/103 |
| 2005/0096835 A1 * | 5/2005 | Piwonka | ............... | F02D 41/18 701/115 |
| 2006/0075996 A1 * | 4/2006 | Yoshino | ............... | F01L 1/344 123/568.14 |
| 2007/0225892 A1 * | 9/2007 | Yasui | ............... | F02D 13/023 701/104 |
| 2008/0087250 A1 * | 4/2008 | Robinson | ............... | F02D 41/266 123/445 |
| 2008/0092645 A1 * | 4/2008 | Kanke | ............... | G01F 1/6845 73/204.14 |
| 2009/0055081 A1 * | 2/2009 | Yasui | ............... | F02D 13/023 701/103 |
| 2011/0004422 A1 * | 1/2011 | Akagi | ............... | G01F 1/6965 702/46 |
| 2011/0023852 A1 * | 2/2011 | Yamashita | ............... | F01M 13/00 123/574 |
| 2013/0036788 A1 * | 2/2013 | Sekine | ............... | F02D 45/00 73/1.16 |
| 2013/0041570 A1 * | 2/2013 | Sekine | ............... | G01F 9/023 701/102 |
| 2013/0166180 A1 * | 6/2013 | Yoshikawa | ............... | F02D 41/182 701/104 |
| 2013/0319377 A1 * | 12/2013 | Stevens | ............... | F02D 41/40 123/480 |
| 2019/0085775 A1 * | 3/2019 | Won | ............... | F02D 13/0215 |
| 2020/0018253 A1 * | 1/2020 | Yamada | ............... | F02D 13/0234 |
| 2021/0140385 A1 * | 5/2021 | Kurita | ............... | F02D 41/2454 |

FOREIGN PATENT DOCUMENTS

| | | | |
|---|---|---|---|
| JP | 06307273 A | * | 11/1994 |
| JP | 07243344 A | * | 9/1995 |
| JP | 2003193888 A | * | 7/2003 |
| JP | 2013221418 A | * | 10/2013 |
| JP | 2020-12387 A | | 1/2020 |

\* cited by examiner

Fig.8

ENGINE CONTROLLER, ENGINE CONTROL METHOD, AND MEMORY MEDIUM

BACKGROUND

1. Field

The present disclosure relates to an engine controller that controls an engine by calculating an intake air amount introduced into a cylinder and operating an actuator, such as an injector, based on the calculated value of the intake air amount.

2. Description of Related Art

Control of an operating state of an engine is performed by operating actuators such as injectors and a throttle valve. For example, control of an air-fuel ratio of air-fuel mixture burned in a cylinder is performed by determining a fuel injection amount required to bring the air-fuel ratio to a target value based on an intake air amount introduced into the cylinder and operating the injector to inject fuel of the determined fuel injection amount. Accurate acquisition of the intake air amount is necessary for improving the control accuracy of the above-described engine control, which is performed by determining an operation amount of the actuator based on the intake air amount.

Known calculation methods of an intake air amount include three methods: a mass flow method, a speed density method, and throttle speed method. In the mass flow method, an intake air amount is calculated from an intake air flow rate detected by an air flow meter disposed in a section of an intake passage that is upstream of a throttle valve. In the speed density method, an intake air amount is calculated by detecting an intake pipe pressure with an intake pipe pressure sensor disposed in a section of an intake passage that is downstream of a throttle valve and using an intake air flow rate estimated based on the intake pipe pressure and an engine rotation speed. In the throttle speed method, an intake air amount is calculated from an intake air flow rate estimated based on a throttle opening degree and an engine rotation speed.

Normally, among these three calculation methods, the mass flow method most accurately calculates the intake air amount during steady operation of the engine. Since each cylinder of the engine intermittently draws intake air in accordance with opening and closing of the intake valve, the flow of intake air in the intake passage is accompanied by pulsation. Such intake air pulsation influences the detected value of the air flow meter. Thus, in engine operational zones of great intake air pulsation, the speed density method and the throttle speed method more accurately calculate the intake air amount than the mass flow method in some cases.

In this regard, Japanese Laid-Open Patent Publication No. 1-265122 discloses an engine controller that calculates an intake air amount while switching calculation methods in accordance with a magnitude of intake air pulsation. The engine controller of the document determines whether intake air pulsation is great based on an output of an air flow meter. When determining that the intake air pulsation is not great, the engine controller calculates the intake air amount by the mass flow method. When determining that the intake air pulsation is great, the engine controller calculates the intake air amount by the speed density method or the throttle speed method.

When the responsivity of the air flow meter is reduced due to, for example, collected deposit, the intake air pulsation is unlikely to influence the output of the air flow meter. In such a case, it is impossible to accurately determine whether the intake air pulsation is great. As a result, the mass flow method may continue to be used to calculate the intake air amount even when the intake air pulsation is great. This may reduce the control accuracy of the engine control performed based on the calculated value of the intake air amount.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Aspect 1. An aspect of the present disclosure provides an engine controller that controls an operating state of an engine through operation of an actuator provided to the engine. The engine controller is configured to perform the following processes. A first calculation process calculates an intake air amount introduced into a cylinder of the engine, and calculates the intake air amount based on an output of an air flow meter that detects an intake air flow rate in an intake passage of the engine. A second calculation process calculates the intake air amount based on at least one of a detected value of an intake pipe pressure and a throttle opening degree, without using the output of the air flow meter. A first determination process determines whether an intake air pulsation in the intake passage is great based on the output of the air flow meter. A second determination process determines whether the intake air pulsation in the intake passage is great based on at least one of the detected value of the intake pipe pressure and the throttle opening degree, without using the output of the air flow meter. When the intake air pulsation is not determined to be great by both of the first determination process and the second determination process, a calculation method switching process selects the calculated value of the intake air amount obtained by the first calculation process as a calculated value of the intake air amount used to determine an operation amount of the actuator. When the intake air pulsation is determined to be great by at least one of the first determination process and the second determination process, the calculation method switching process selects the calculated value of the intake air amount obtained by the second calculation process as the calculated value of the intake air amount used to determine the operation amount of the actuator.

The first calculation process performs the calculation of the intake air amount by the mass flow method based on the detected value of the intake air flow rate of the air flow meter. The second calculation process performs at least one of the calculation of the intake air amount by the speed density method based on the detected value of the intake pipe pressure and the calculation of the intake air amount by the throttle speed method based on the throttle opening degree. When the intake air pulsation is great, the detection accuracy of the intake air flow rate acquired by the air flow meter is reduced. Accordingly, the calculation accuracy of the intake air amount of the mass flow method is reduced. The above-described engine controller performs two processes that determine whether the intake air pulsation is great: the first determination process, which performs the determination based on the output of the air flow meter, and the second determination process, which performs the determination based on at least one of the detected value of the intake pipe pressure and the throttle opening degree, without using the output of the air flow meter. In either of the first determination process and the second determination process, if it is not determined that the intake air pulsation is great, the calculated value of the intake air amount of the first determination process is used as the calculated value of the intake air amount used to determine the operation amount of the actuator. In at least one the first determination process and the second determination process, if it is determined that the intake air pulsation is great, the calculated value of the intake air amount of the second determination process is used as the calculated value of the intake air amount used to determine the operation amount of the actuator.

The magnitude of the intake air pulsation can be directly obtained from the output of the air flow meter. Thus, as long as the output of the air flow meter is ensured to be a value that accurately reflects the actual intake air flow rate, it is possible to determine whether the intake air pulsation is great by the first determination process.

When the throttle opening degree is greater than a certain degree, the intake air pulsation is increased. When the throttle opening degree is increased, the intake pipe pressure is increased. Thus, even the second determination process, which is based on at least one of the detected value of the intake pipe pressure and the throttle opening degree, determines whether the intake air pulsation is great with a certain level of accuracy.

When the engine is operating, collected deposit may temporarily reduce the responsivity of the air flow meter. When the responsivity is reduced, the intake air pulsation is unlikely to influence the output of the air flow meter. Thus, even if the intake air pulsation is increased, the first determination process may fail to determine that the intake air pulsation has increased. Even in such a case, the second determination process determines that the intake air pulsation is great since the determination is performed without using the output of the air flow meter. Therefore, the above-described engine controller uses the mass flow method even when the responsivity of the air flow meter is temporarily reduced if the intake air pulsation is small, and uses the speed density method or the throttle speed method if the intake air pulsation is great. That is, the above-described engine controller is capable of switching the calculation methods used to determine the operation amount of the actuator in accordance with the magnitude of the intake air pulsation. Therefore, when the responsivity of the air flow meter is temporarily reduced, the above-described engine controller properly switches the calculation methods used to determine the operation amount of the actuator in accordance with increase or decrease in the intake air pulsation.

Aspect 2. In the engine controller according to Aspect 1, the second determination process is capable of determining that the intake air pulsation is great on a condition that the throttle opening degree is greater than or equal to a great opening degree determination value that is set based on the engine rotation speed.

Aspect 3. In the engine controller according to Aspect 1, the second determination process is capable of determining that the intake air pulsation is great on a condition that the intake pipe pressure is greater than or equal to a great pulsation region determination value that is set based on the engine rotation speed.

Aspect 4. When intake air pulsation is generated, the intake pipe pressure fluctuates. Thus, in the engine controller according to Aspect 1, the second determination process is capable of determining that the intake air pulsation is great based on a fact that fluctuation of the detected value of the intake pipe pressure is great.

In some cases, the output of the air flow meter is used to determine whether there is an anomaly in the air flow meter. Such determination as to whether there is an anomaly in the air flow meter by using the output of the air flow meter cannot be properly performed in a case where an increase in the intake air pulsation has reduced the detection accuracy of the air flow meter. Therefore, when the intake air pulsation is great, it is preferable not to perform the determination as to whether there is an anomaly by using the output of the air flow meter.

As described above, the determination as to whether the intake air pulsation is great can be performed by the first determination process based on the output of the air flow meter or by the second determination process based on the detected value of the intake pipe pressure or the throttle opening degree. However, when there is a possibility of an anomaly in the air flow meter, the determination result of the first determination process based on the air flow meter is unreliable.

Aspect 5. Accordingly, the engine controller according to Aspect 1 is preferably configured to perform an anomaly determination process on a condition that the second determination process has not determined that the intake air pulsation is great (S120: NO), wherein the anomaly determination process determines whether there is an anomaly in the air flow meter by using the output of the air flow meter.

When there is an anomaly in the air flow meter, the calculation accuracy of the intake air amount of the first calculation process based on the output of the air flow meter is reduced. In contrast, the calculation accuracy of the intake air amount of the second calculation process, which does not use the output of the air flow meter, is not reduced. This increases the deviation between the calculated values of the intake air amount of the calculation processes.

Aspect 6. Accordingly, in the engine controller according to Aspect 5, the anomaly determination process is capable of determining that there is an anomaly in the air flow meter based on fact that a difference between a calculated value of the intake air amount calculated by the first calculation process and a calculated value of the intake air amount calculated by the second calculation process is great.

Aspect 7. An engine control method is provided that performs the various processes described in any one of the above Aspects.

Aspect 8. A non-transitory computer readable memory medium is provided that stores a program that causes a processing device to perform the various processes described in any one of the above Aspects.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Figure 1:
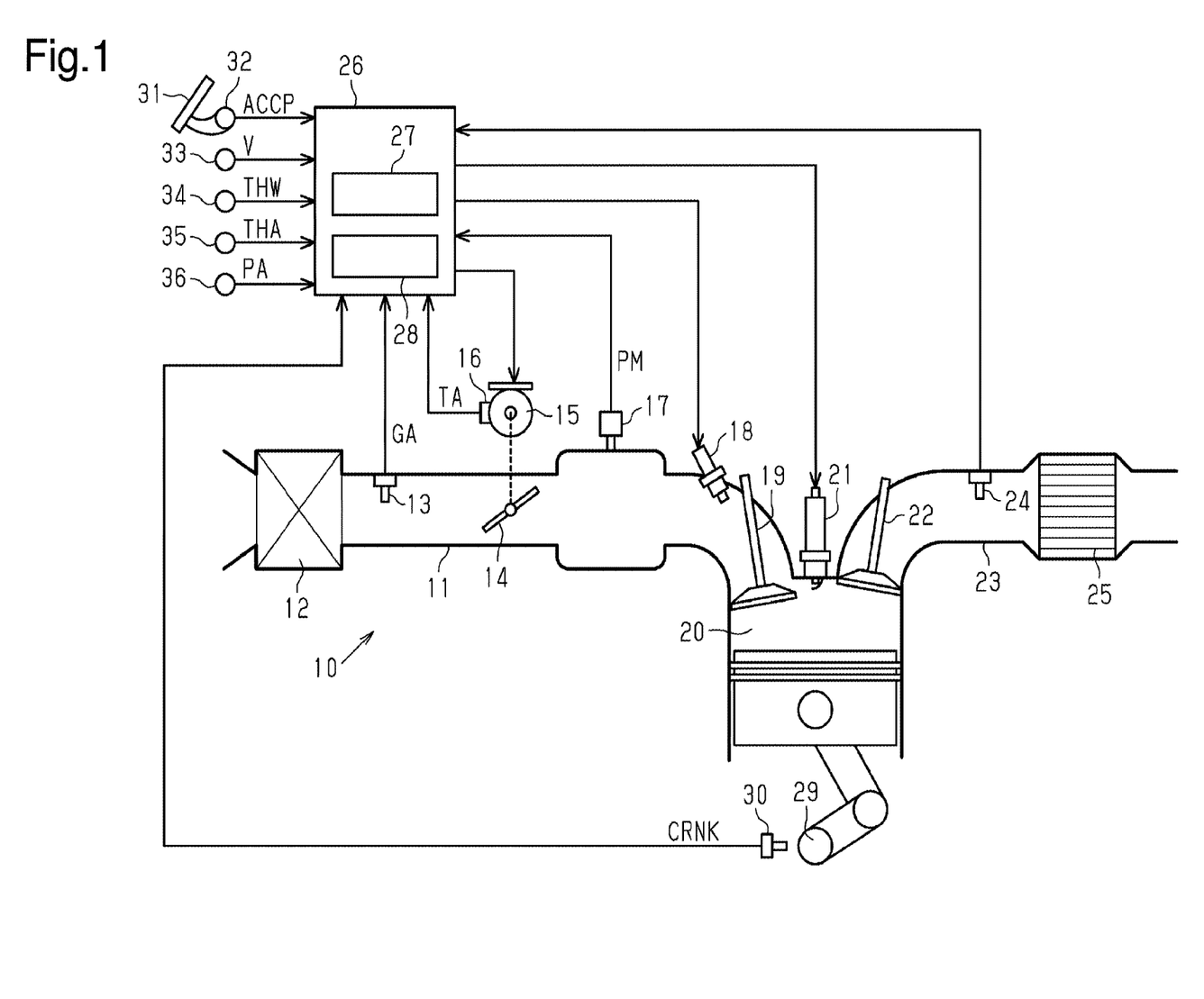
FIG. 1 is a schematic diagram showing an engine controller according to a first embodiment.

An engine controller according to a first embodiment will now be described with reference to FIGS. 1 to 3. First, the configuration of the engine controller according to the present embodiment will be described with reference to FIG. 1. The engine controller according to the present embodiment is employed in a vehicle-mounted multi-cylinder engine 10. FIG. 1 illustrates only one of the multiple cylinders in the engine 10.

As shown in FIG. 1, the engine 10, in which the engine controller of each embodiment is employed, includes an air cleaner 12 for filtering out dust and the like in intake air in the most upstream section of an intake passage 11. The intake passage 11 is provided with an air flow meter 13, which detects an intake air flow rate GA, in a section downstream of the air cleaner 12.

In the present embodiment, a hot-wire air flow meter is used as the air flow meter 13. The hot-wire air flow meter 13 has a bridge circuit that includes a resistor for measuring an intake air temperature and a hot wire made of a heating resistor. The resistor for measuring the intake air temperature and the heating resistor are located in the intake passage 11. In the air flow meter 13, power supplied to the heating resistor is feedback-controlled such that the temperature difference between the intake air temperature measuring resistor and the heating resistor is maintained at a certain value. The power supplied to the heating resistor is converted into a voltage to be output from the air flow meter 13 as a detection signal of the intake air flow rate GA.

The intake passage 11 is provided with a throttle valve 14 in a section downstream of the air flow meter 13. The throttle valve 14 regulates the intake air flow rate. A throttle motor 15 and a throttle sensor 16 are provided in the vicinity of the throttle valve 14. The throttle motor 15 selectively opens and closes the throttle valve 14. The throttle sensor 16 detects the opening degree of the throttle valve 14. The intake passage 11 is provided with an intake pipe pressure sensor 17 in a section downstream of the throttle valve 14. The intake pipe pressure sensor 17 detects the pressure of the intake air flowing in the section. The opening degree of the throttle valve 14 will hereafter be referred to as a throttle opening degree TA. The pressure of intake air detected by the intake pipe pressure sensor 17 will be referred to as an intake pipe pressure PM.

The intake passage 11 is provided with an injector 18 in a section downstream of the intake pipe pressure sensor 17. The injector 18 sprays fuel into intake air. The intake passage 11 is connected to a combustion chamber 20 via an intake valve 19. The combustion chamber 20 is provided with an ignition device 21, which ignites air-fuel mixture by spark discharge.

The combustion chamber 20 is connected to an exhaust passage 23 via an exhaust valve 22. The exhaust passage 23 is provided with an air-fuel ratio sensor 24 and a catalyst device 25. The air-fuel ratio sensor 24 detects the air-fuel ratio of the air-fuel mixture that has been burned in the combustion chamber 20. The catalyst device 25 purifies exhaust gas. Among the above-described components of the engine 10, the injector 18, the intake valve 19, the combustion chamber 20, the ignition device 21, and the exhaust valve 22 are provided in each of the respective cylinders.

The engine 10 is controlled by an electronic control unit 26, which serves as the engine controller. The electronic control unit 26 has an arithmetic processing circuit 27, which executes various types of calculation processes related to engine control, and a memory 28 storing programs and data for control. The electronic control unit 26 receives detection signals from the air flow meter 13, the throttle sensor 16, the intake pipe pressure sensor 17, and the air-fuel ratio sensor 24. The electronic control unit 26 also receives detection signals from a crank angle sensor 30, an accelerator pedal sensor 32, a vehicle speed sensor 33, a coolant temperature sensor 34, an intake air temperature sensor 35, and an atmospheric pressure sensor 36. The crank angle sensor 30 detects a crank angle CRNK, which is a rotational angle of a crankshaft 29. The crankshaft 29 is an output shaft of the engine 10. The accelerator pedal sensor 32 detects an acceleration pedal depression amount ACCP, which is the amount of depression of an accelerator pedal 31. The vehicle speed sensor 33 detects a vehicle speed V of the vehicle on which the engine 10 is mounted. The coolant temperature sensor 34 detects a coolant temperature THW of the engine 10. The intake air temperature sensor 35 detects an intake air temperature THA, which is the temperature of intake air drawn into the intake passage 11. The atmospheric pressure sensor 36 detects an atmospheric pressure PA.

Based on the detection signals from these sensors, the electronic control unit 26 determines operation amounts of the throttle motor 15, the injector 18, and the ignition device 21 and operates these components, thereby controlling the operating state of the engine 10. The electronic control unit 26 calculates an engine rotation speed NE from the detection results of the crank angle CRNK acquired by the crank angle sensor 30.

The electronic control unit 26 controls the amount of fuel injected by the injector 18 of each cylinder. In other words, the electronic control unit 26 performs a fuel injection amount control as part of the engine control. When performing the fuel injection amount control, the electronic control unit 26 first calculates an intake air amount introduced into each cylinder of the engine 10. Subsequently, the electronic control unit 26 divides the calculated value of the intake air amount by the stoichiometric air-fuel ratio to obtain a quotient, which is used as an instructed injection amount. The electronic control unit 26 performs the fuel injection amount control by operating the injector 18 of each cylinder to inject the amount of fuel corresponding to the instructed injection amount.

Figure 2:
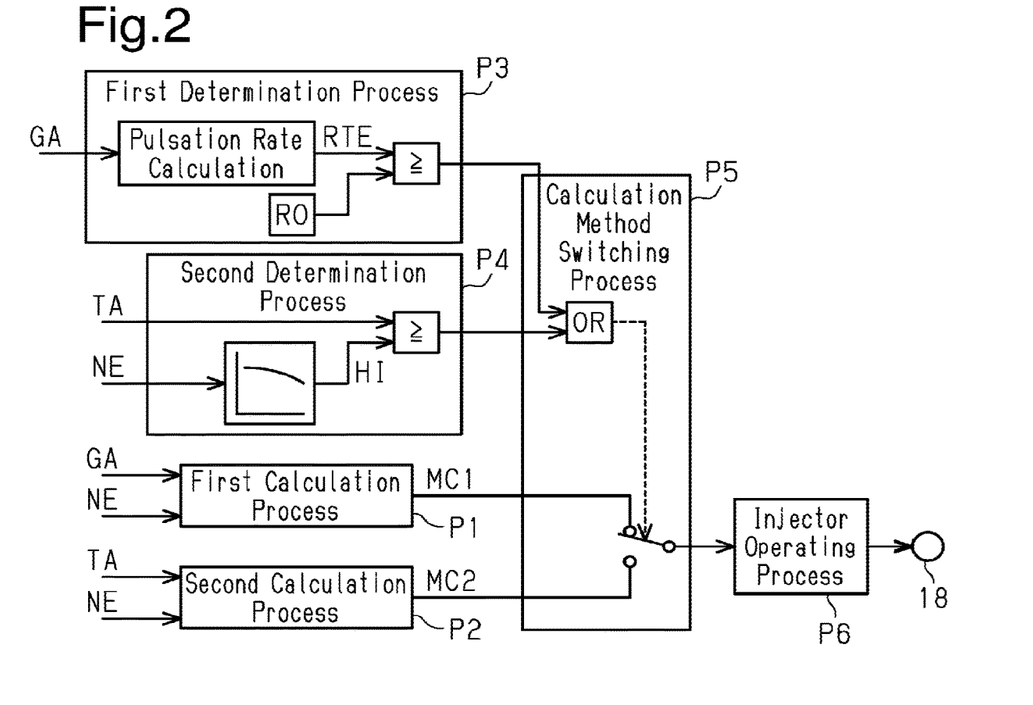
FIG. 2 is a block diagram showing flows of processes related to fuel injection amount control performed by the engine controller according to the first embodiment.
Figure 3:
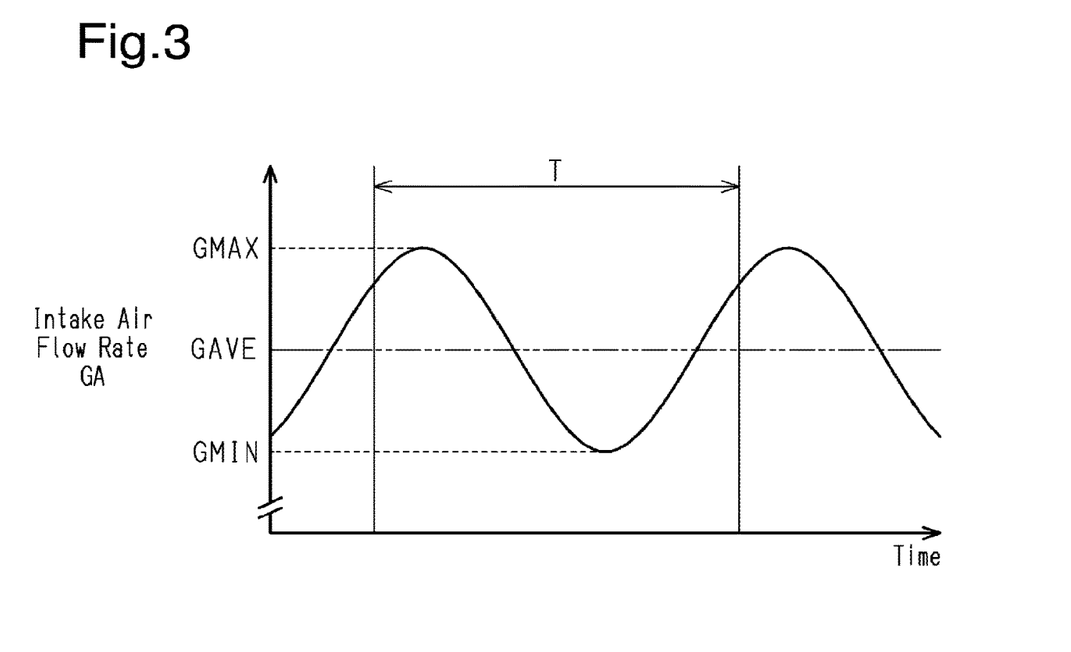
FIG. 3 is a graph showing a manner in which a pulsation rate is calculated in the first determination process, which is performed when the engine controller of FIG. 2 performs the fuel injection amount control.

FIG. 2 shows flows of processes related to the fuel injection amount control performed by the electronic control unit 26. As shown in FIG. 2, the fuel injection amount control in the engine controller of the present embodiment is performed through a first calculation process P1, a second calculation process P2, a first determination process P3, a second determination process P4, a calculation method switching process P5, and an injector operating process P6.

The first calculation process P1 calculates the intake air amount introduced into the cylinder of the engine 10 based on the engine rotation speed NE and the output of the air flow meter 13, which is the detected value of the intake air flow rate GA acquired by the air flow meter 13. That is, the first calculation process P1 performs calculation of the intake air amount by the mass flow method based on the intake air flow rate GA of the air flow meter 13. In the following description, the calculated value of the intake air amount obtained by the first calculation process P1 will be referred to as a first intake air amount calculated value MC1.

The second calculation process P2 performs calculation of the intake air amount based on the throttle opening degree TA and the engine rotation speed NE. That is, the second calculation process P2 performs calculation of the intake air amount by the throttle speed method based on the throttle opening degree TA. In the following description, the calculated value of the intake air amount obtained by the second calculation process P2 will be referred to as a second intake air amount calculated value MC2.

In the intake passage 11 of the engine 10, intermittent inflow of intake air into the combustion chamber 20 in response to opening and closing of the intake valve 19 generates pressure fluctuation of the intake air. The pressure fluctuation generated in response to opening and closing of the intake valve 19 is propagated upstream over the entire intake passage 11. The first determination process P3 and the second determination process P4 separately perform determination as to whether the pressure fluctuation of intake air, or the intake air pulsation at a position in the intake passage 11 where the air flow meter 13 is disposed is great. In the following description, the determination as to whether such intake air pulsation is great will be referred to as pulsation determination.

The first determination process P3 performs the pulsation determination based on the output of the air flow meter 13. Specifically, the first determination process P3 determines that the intake air pulsation is great when the value of a pulsation rate RTE, which is obtained from the detected value of the intake flow rate GA acquired by the air flow meter 13, is greater than or equal to a prescribed great pulsation determination value RO. The pulsation rate RTE is calculated from a maximum value GMAX, a minimum value GMIN, and an average value GAVE of the intake air flow rate GA in a prescribed period T. The difference obtained by subtracting the maximum value GMAX from the maximum value GMAX is divided by the average value GAVE, and the resultant quotient is obtained as the pulsation rate RTE. The period T is set to be longer than the cycle of the intake air pulsation.

The second determination process P4 performs the pulsation determination based on the throttle opening degree TA. Specifically, the second determination process P4 determines that the intake air pulsation is great when the value of the throttle opening degree TA is greater than or equal to a great opening degree determination value HI. In the present embodiment, the great opening degree determination value HI is set based on the engine rotation speed NE. The great opening degree determination value HI corresponding to each value of the engine rotation speed NE is set to the upper limit of the throttle opening degree TA that limits reduction in the detection accuracy of the air flow meter 13 due to intake air pulsation to a permissible range at that value of the engine rotation speed NE.

The calculation method switching process P5 selects one of the first intake air amount calculated value MC1 and the second intake air amount calculated value MC2 as the calculated value of the intake air amount to be delivered to the injector operating process P6. Specifically, when both of the first determination process P3 and the second determination process P4 determine that the intake air pulsation is not great, the first intake air amount calculated value MC1, which is calculated by the first calculation process P1, is delivered to the injector operating process P6. Specifically, when at least one of the first determination process P3 and the second determination process P4 determines that the intake air pulsation is great, the second intake air amount calculated value MC2, which is calculated by the second calculation process P2, is delivered to the injector operating process P6.

The injector operating process P6 calculates a value of an instructed injection amount Q, which is an instructed value of the fuel injection amount of the injector 18, based on the calculated value delivered from the calculation method switching process P5, and operates the injector 18 of each cylinder to inject the amount of fuel corresponding to the instructed injection amount Q. Specifically, the injector operating process P6 first divides the calculated value of the intake air amount delivered from the calculation method switching process P5 by the stoichiometric air-fuel ratio and uses the resultant quotient as the value of a base injection amount QBSE. Further, the instructed injection amount Q is set to the value obtained by correcting the base injection amount QBSE, for example, through air-fuel ratio feedback correction based on the detection result of the air-fuel ratio sensor 24, and the injector 18 is operated based on the value of the instructed injection amount Q.

The operation and advantages of the present embodiment will now be described.

In the intake passage 11 of the engine 10, intermittent opening of the intake valve 19 generates intake air pulsation. When such intake air pulsation becomes great, the detection accuracy of the air flow meter 13 may be reduced due to the influence of the intake air pulsation.

To deal with such a situation, the first calculation process P1 of the present embodiment calculates the intake air amount by the mass flow method based on the output of the air flow meter 13, and the second calculation process P2 calculates the intake air amount by the throttle speed method based on the throttle opening degree TA. When the detection accuracy of the air flow meter 13 is reduced, the detection accuracy of the intake air amount of the first calculation process P1 is also reduced. Thus, if the instructed injection amount Q of the injector 18 is determined by using the first intake air amount calculated value MC1 in the first calculation process P1 even when the intake air pulsation is great, the control accuracy of the fuel injection amount is reduced. In the present embodiment, the instructed injection amount Q is determined by using the first intake air amount calculated value MC1, which is calculated by the first calculation process P1, when the intake air pulsation is small. The instructed injection amount Q is determined by using the second intake air amount calculated value MC2, which is calculated by the second calculation process P2, when the intake air pulsation is great. As described above, in the present embodiment, the calculation method of the intake air amount used to determine the fuel injection amount is switched from the mass flow method to the throttle speed method when the intake air pulsation is great. This limits reduction in the control accuracy of the fuel injection amount due to an increase in the intake air pulsation.

The present embodiment includes two processes that determine whether the intake air pulsation is great: the first determination process P3, which performs the pulsation determination by using the output of the air flow meter 13, and the second determination process P4, which performs the pulsation determination using the throttle opening degree TA. When at least one of the first determination process P3 and the second determination process P4 determines that the intake air pulsation is great, the calculation method of the intake air amount used to determine the fuel injection amount is switched from the mass flow method to the throttle speed method, assuming that the intake air pulsation is great.

The magnitude of the intake air pulsation in a section of the intake passage 11 where the air flow meter 13 is disposed can be estimated with a certain level of accuracy from the throttle opening degree TA and the engine rotation speed NE. The second determination process P4 is also capable of performing the pulsation determination with a certain level of accuracy. If the air flow meter 13 accurately detects the intake air flow rate, the pulsation determination can be performed more accurately by directly acquiring the intake air pulsation from the detection result of the air flow meter 13, that is, by the first determination process P3, than by the second determination process P4.

However, when the engine 10 is operating, deposit in the intake air may collect on the hot wire of the air flow meter 13 and, as a result, temporarily reduce the responsivity of the air flow meter 13. In such a case, the influence of the intake air pulsation is unlikely to be reflected on the output of the air flow meter 13. Thus, even if the intake air pulsation is increased, the first determination process P3 may fail to determine that the intake air pulsation is great. The pulsation determination by the second determination process P4, which uses the throttle opening degree TA, can be performed when the responsivity of the air flow meter 13 is low in the same way as when the responsivity is not low. Thus, even if the responsivity of the air flow meter 13 is temporarily lowered, at least the second determination process P4 determines that the intake air pulsation is great when the intake air pulsation is great. As described above, in the present embodiment, when at least one of the first determination process P3 and the second determination process P4 determines that the intake air pulsation is great, the calculation method of the intake air amount is switched from the mass flow method to the throttle speed method. Therefore, the engine controller of the present embodiment is capable of properly switching the calculation method of the intake air amount in accordance with the intake air pulsation even when the responsivity of the air flow meter 13 is temporarily lowered. It is thus possible to maintain the control accuracy of the fuel injection amount based on the calculated value of the intake air amount.

In the present embodiment, the injector 18 corresponds to the actuator installed in the engine 10 that is operated by the engine controller, which controls the operating state of the engine 10. The instructed injection amount Q, which is an instructed value of the fuel injection amount of the injector 18, corresponds to the operation amount of the actuator.

Regarding Setting of Great Opening Degree Determination Value HI

The second determination process P4 of the present embodiment performs the pulsation determination by comparing the great opening degree determination value HI, which is set based on the engine rotation speed NE, and the throttle opening degree TA with each other. Depending on the operation environment and the structure of the engine, there may be a state quantity that greatly influences the intake air pulsation in addition to the engine rotation speed NE and the throttle opening degree TA. In such a case, that state quantity can be used to set the great opening degree determination value HI in addition to the engine rotation speed NE, so as to improve the accuracy of the pulsation determination by the second determination process P4. For example, in an engine equipped with a variable valve timing mechanism, which varies valve timing of the intake valve 19 or the exhaust valve 22, the setting of the valve timing may greatly influence the intake air pulsation. For example, when the valve timing of the intake valve 19 is retarded to be later than the compression bottom dead center, some of the intake air that was introduced into the combustion chamber 20 during the intake stroke is pushed back into the intake passage 11 after the compression stroke starts. This increases the intake air pulsation. Also, when valve overlap is changed by changing the valve timing of the intake valve 19 and the exhaust valve 22, the situation of inflow of intake air into the combustion chamber 20 changes, which may influence the intake air pulsation. Accordingly, in an engine equipped with a variable valve timing mechanism, the setting amount of the valve timing used by the variable valve timing mechanism is preferably added to the state quantities used to set the great opening degree determination value HI.

In an engine equipped with an EGR mechanism, which recirculates some of the exhaust gas to intake air, and an engine equipped with a vapor purge mechanism, which releases fuel vapor generated in the fuel tank into the intake air, the flow rate of intake air flowing through the throttle valve 14 is changed depending on the amount of recirculated exhaust gas or fuel vapor introduced into the intake air. Due to the influence of the changed flow rate, the relationship of the throttle opening degree TA and the engine rotation speed NE with the magnitude of the intake air pulsation is changed. Thus, in an engine equipped with an EGR mechanism, the amount of exhaust gas recirculated to the intake air is preferably added to the state quantities used to set the great opening degree determination value HI. In an engine equipped with a vapor purge mechanism, the amount of fuel vapor released to intake air is preferably added to the state quantities used to set the great opening degree determination value HI.

The flow rate of the intake air passing through the throttle valve 14 changes depending on environmental factors such as an intake air temperature THA, the atmospheric pressure PA, the coolant temperature THW, and such a change may influence the intake air pulsation. Accordingly, when the influence of such environmental factors on the intake air pulsation is great, the intake air temperature THA, the atmospheric pressure PA, and the coolant temperature THW are preferably added to the state quantities used to set the great opening degree determination value HI.

Regarding Setting of Hysteresis

In a vehicle-mounted engine, throttle opening degree TA may be frequently changed depending on the traveling situation of the vehicle on which the engine is mounted. Accordingly, when the throttle opening degree TA repeatedly rises above and falls below the great opening degree determination value HI in a short period of time, the calculation method of the intake air amount is frequently switched between the mass flow method and the throttle speed method, resulting in an unstable fuel injection amount control. To deal with such a situation, hysteresis is preferably provided in the pulsation determination by the second determination process P4. That is, the second determination process P4 performs the pulsation determination in the following manner. First, as the great opening degree determination value HI, an ON determination value HI1 and an OFF determination value HI2 are set. If the intake air pulsation in the previous pulsation determination was not determined to be great, the intake air pulsation is determined to be great if the throttle opening degree TA is greater than or equal to the ON determination value HI1. In contrast, if the intake air pulsation in the previous pulsation determination was determined to be great, the intake air pulsation is determined to be great if the throttle opening degree TA is less than the OFF determination value HI1. If hysteresis is provided in the pulsation determination by the second determination process P4 as described above, the calculation method of the intake air amount will not be changed frequently even if the throttle opening degree TA is changed frequently.

Second Embodiment

An engine controller according to a second embodiment will now be described with reference to FIG. 4. In the second embodiment and the subsequent embodiments, the structures common to those of the first embodiment are identified by the same reference numbers and will not be described in detail. The hardware construction of the engine controller according to the present embodiment and the subsequent embodiments is the same as that of the first embodiment.

The second determination process P4 of the engine controller according to the first embodiment performs the pulsation determination by using the throttle opening degree TA. The throttle opening degree TA is closely related to the pressure of the intake air in a section of the intake passage 11 that is downstream of the throttle valve 14, that is, the intake pipe pressure PM. That is, when the throttle opening degree TA is reduced, the intake pipe pressure PM is reduced. When the throttle opening degree TA is increased, the intake pipe pressure PM is increased. Accordingly, in the pulsation determination, the second determination process performs the pulsation determination by using the intake pipe pressure PM instead of the throttle opening degree TA.

Figure 4:
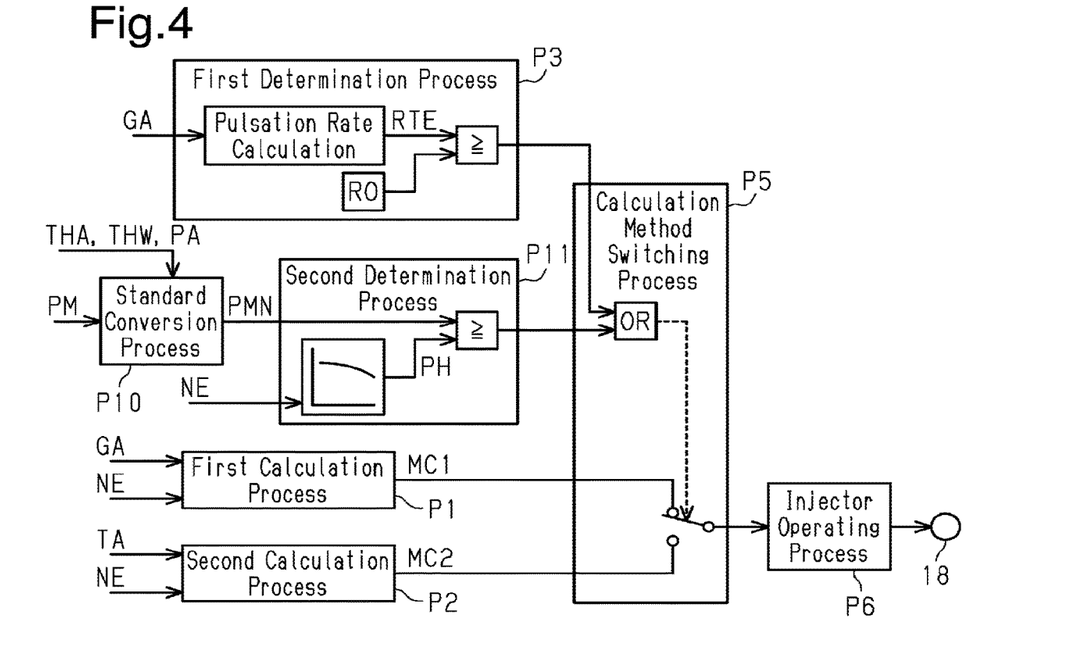
FIG. 4 is a block diagram showing flows of processes related to fuel injection amount control performed by an engine controller according a second embodiment.

FIG. 4 shows flows of the processes of the electronic control unit 26 related to the fuel injection amount control in the engine controller of the present embodiment. The first calculation process P1, the second calculation process P2, the first determination process P3, the calculation method switching process P5, and the injector operating process P6 shown in FIG. 4 are the same processes as those of the first determination process P3 shown in FIG. 2. In the present embodiment, the second determination process P4 performed by the engine controller of the first embodiment is replaced by a standard conversion process P10 and a second determination process P11.

The standard conversion process P10 calculates a standard conversion value PMN of the intake pipe pressure PM of the intake pipe pressure sensor 17. The correspondence relationship between the throttle opening degree TA and the intake pipe pressure PM changes in accordance with the atmospheric pressure PA and an intake manifold temperature, which is the temperature of the intake air in a section of the intake passage 11 that is downstream of the throttle valve 14. The intake manifold temperature can be obtained from the intake air temperature THA or the coolant temperature THW. The standard conversion process P10 subtracts a change caused by differences between the current values of the intake manifold temperature and the atmospheric pressure PA and prescribed standard values from the detected value of the intake pipe pressure PM acquired by the intake pipe pressure sensor 17, and uses the resultant as the value of the standard conversion value PMN.

The second determination process P11 performs the pulsation determination by using the standard conversion value PMN of the intake pipe pressure PM calculated by the standard conversion process P10. Specifically, the second determination process P11 determines that the intake air pulsation is great when the standard conversion value PMN is greater than or equal to a great pulsation region determination value PH. The great pulsation region determination value PH is set based on the engine rotation speed NE. The great pulsation region determination value PH corresponding to each value of the engine rotation speed NE is set to the value of the intake pipe pressure PM when the magnitude of the intake air pulsation at that engine rotation speed NE is the upper limit of the permissible range that ensures the detection accuracy of the air flow meter 13.

Like the first embodiment, the second embodiment is capable of properly switching the calculation method of the intake air amount in accordance with the intake air pulsation even when the responsivity of the air flow meter 13 is temporarily lowered. Accordingly, it is possible to maintain the control accuracy of the fuel injection amount based on the calculated value of the intake air amount. In the second embodiment, the pulsation determination by the second determination process P11 uses the standard conversion value PMN of the intake pipe pressure PM. This configuration limits the influence of the environmental factors such as the intake manifold temperature and the atmospheric pressure PA on the result of the pulsation determination. Therefore, the accuracy of the pulsation determination is improved as compared to a case in which the detected value of the intake pipe pressure PM acquired by the intake pipe pressure sensor 17 is used without being changed in the pulsation determination.

If the required determination accuracy is ensured, the detected value of the intake pipe pressure PM acquired by the intake pipe pressure sensor 17 may be used without being changed in the pulsation determination by the second determination process P11. In a case in which the second determination process P11 performs the pulsation determination by using the detected value of the intake pipe pressure PM without changing it, it is possible to ensure the determination accuracy by adding the intake air temperature THA, the atmospheric pressure PA, or the coolant temperature THW, to the state quantities used to set the great pulsation region determination value PH. Further, depending on the configuration of the engine, the set value of the valve timing of the intake valve 19 or the exhaust valve 22 set by the variable valve timing mechanism, the amount of exhaust gas recirculation to the intake air by the EGR mechanism, and the amount of fuel vapor released into the intake air by the vapor purge mechanism may be added to the state quantities used to set the great pulsation region determination value PH. Further, the above-described hysteresis, which is defined by the determination values H1, H2, may be used in the pulsation determination by the second determination process P11.

Third Embodiment

An engine controller according to a third embodiment will now be described with reference to FIGS. 5 and 6.

Figure 5:
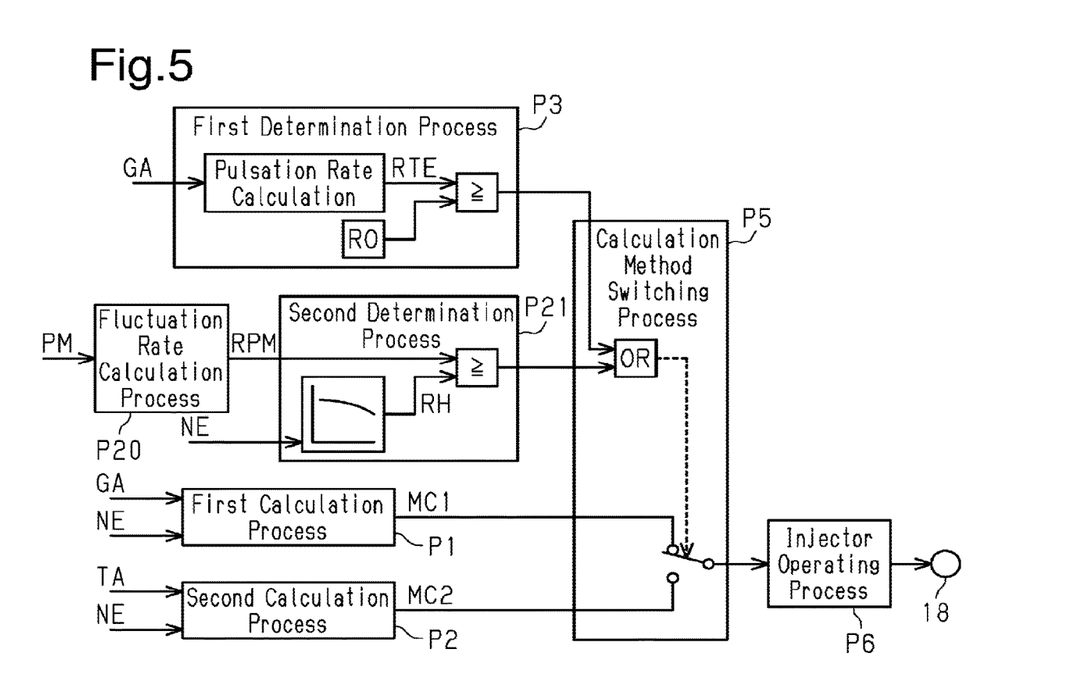
FIG. 5 is a block diagram showing flows of processes related to fuel injection amount control performed by an engine controller according a third embodiment.
Figure 6:
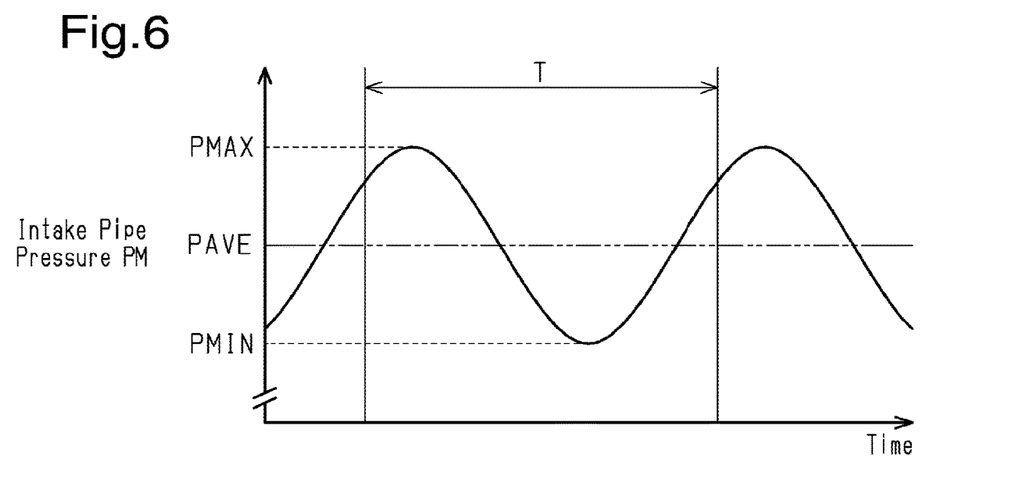
FIG. 6 is a graph showing a manner in which a fluctuation rate of the intake pipe pressure is calculated in a fluctuation rate calculation process, which is performed by the engine controller of FIG. 5 in the fuel injection amount control.

FIG. 5 shows flows of processes of the electronic control unit 26 related to a fuel injection amount control in an engine controller of the present embodiment. The first calculation process P1, the second calculation process P2, the first determination process P3, the calculation method switching process P5, and the injector operating process P6 shown in FIG. 5 are the same processes as those of the second embodiment shown in FIG. 4. In the present embodiment, the standard conversion process P10 and the second determination process P11 performed by the engine controller of the second embodiment are replaced by a fluctuation rate calculation process P20 and a second determination process P21.

The fluctuation rate calculation process P20 calculates a fluctuation rate RPM of the intake pipe pressure PM. The fluctuation rate RPM is calculated from a maximum value PMAX, a minimum value PMIN, and an average value PAVE of the intake air intake pipe pressure PM in the period T. Specifically, the difference obtained by subtracting the minimum value PMIN from the maximum value PMAX of the intake pipe pressure PM is divided by the average value PAVE, and the resultant quotient is used as the fluctuation rate RPM. Accordingly, the fluctuation rate RPM is a parameter indicating the magnitude of the fluctuation of the detected value of the intake pipe pressure PM acquired by the intake pipe pressure sensor 17. The above-described period T is set to be longer than the cycle of the intake air pulsation.

The second determination process P21 performs the pulsation determination by using the fluctuation rate RPM calculated by the fluctuation rate calculation process P20. Specifically, the second determination process P21 determines that the intake air pulsation is great when the fluctuation rate RPM is greater than or equal to a great fluctuation determination value RH. The great fluctuation determination value RH is set based on the engine rotation speed NE. The great fluctuation determination value RH corresponding to each value of the engine rotation speed NE is set to the value of the fluctuation rate RPM when the magnitude of the intake air pulsation at that engine rotation speed NE is the upper limit of the permissible range that ensures the detection accuracy of the air flow meter 13.

The present embodiment is capable of properly switching the calculation method of the intake air amount in accordance with the intake air pulsation even when the responsivity of the air flow meter 13 is temporarily lowered. Accordingly, it is possible to maintain the control accuracy of the fuel injection amount based on the calculated value of the intake air amount.

When the influence of the environmental factors such as the intake manifold temperature and the atmospheric pressure PA on the result of the pulsation determination is great, the fluctuation rate RPM is preferably calculated by using the standard conversion value PMN of the intake pipe pressure PM instead of the intake pipe pressure PM. The intake air temperature THA, the atmospheric pressure PA, and the coolant temperature THW may be added to the state quantities used to set the great fluctuation determination value RH. Further, depending on the configuration of the engine, the set value of the valve timing of the intake valve 19 or the exhaust valve 22 set by the variable valve timing mechanism, the amount of exhaust gas recirculation to the intake air by the EGR mechanism, and the amount of fuel vapor released into the intake air by the vapor purge mechanism may be added to the state quantities used to set the great fluctuation determination value RH. Further, the above-described hysteresis, which is defined by the determination values H1, H2, may be used in the pulsation determination by the second determination process P21.

Fourth Embodiment

An engine controller according to a fourth embodiment will now be described with reference to FIGS. 7 and 8. The engine controller of the present embodiment performs the fuel injection amount control in the same manner as that in the first embodiment. The engine controller of the present embodiment performs anomaly diagnosis of the air flow meter 13 during operation of the engine 10.

Figure 7:
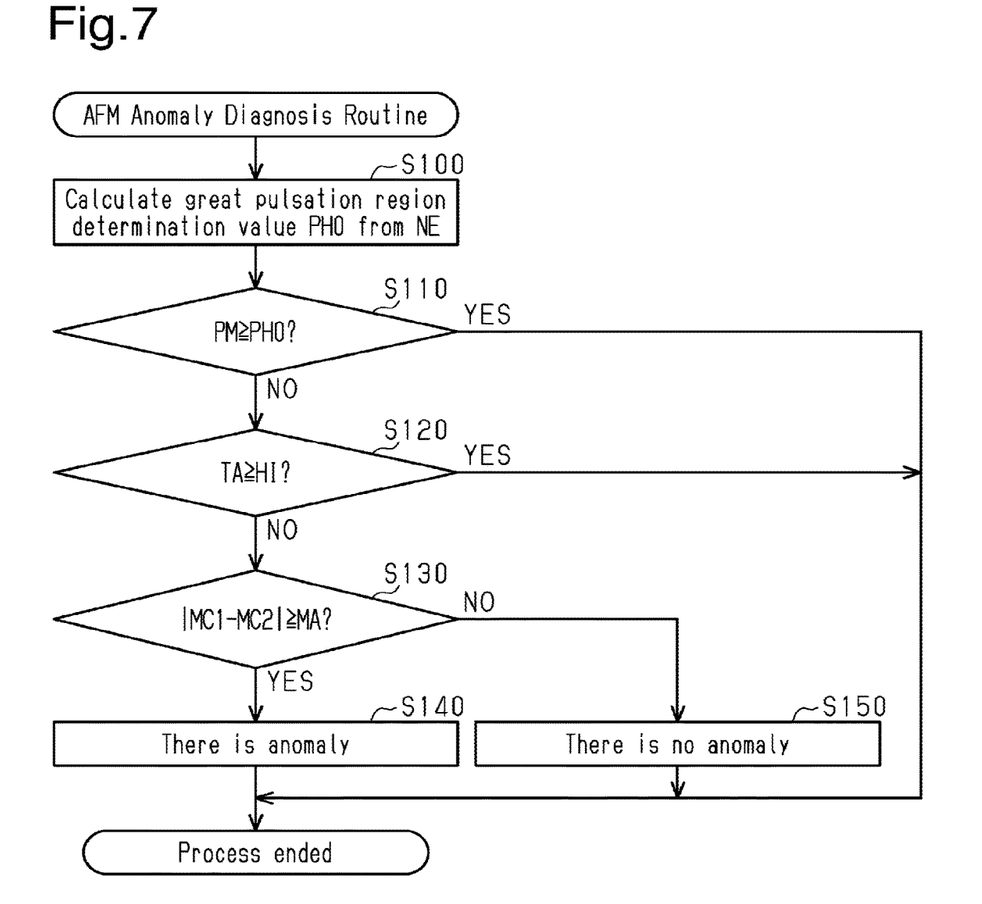
FIG. 7 is a flowchart of an AFM (Air Flow Meter) anomaly diagnosis routine executed by an engine controller according to a fourth embodiment.

FIG. 7 is a flowchart of an AFM anomaly diagnosis routine related to an anomaly diagnosis of the air flow meter 13. The electronic control unit 26 repeatedly executes the processes of the routine at each prescribed control cycle during the operation of the engine 10.

When this routine is started, first, the value of a great pulsation region determination value PH0 is calculated based on the engine rotation speed NE in step S100. Subsequently, in step S100, it is determined whether the detected value of the intake pipe pressure PM acquired by the intake pipe pressure sensor 17 is greater than or equal to the great pulsation region determination value PH0. If the detected value of the intake pipe pressure PM is greater than or equal to the great pulsation region determination value PH0 (S110: YES), the process of the current routine is ended. If the detected value of the intake pipe pressure PM is less than the great pulsation region determination value PH0 (S110: NO), the process proceeds to step S120.

When the process moves to step S120, it is determined whether the value of the throttle opening degree TA is greater than or equal to the great opening degree determination value HI. That is, in step S120, the same determination as that of the pulsation determination by the second determination process P4 shown in FIG. 2 is performed. If the value of the throttle opening degree TA is greater than or equal to the great opening degree determination value HI (S120: YES), the process of the current routine is ended. If the throttle opening degree TA is less than the great opening degree determination value HI (S120: NO), the process proceeds to step S130.

When the process moves to step S130, it is determined whether the difference between the first intake air amount calculated value MC1, which has been calculated by the first calculation process P1, and the second intake air amount calculated value MC2, which has been calculated by the second calculation process P2, is greater than or equal to a prescribed anomaly determination value MA. If the difference is greater than or equal to the anomaly determination value MA (S130: YES), it is determined that there is an anomaly in the air flow meter 13 in step S140. Thereafter, the process of the current routine is ended. If the difference is less than the anomaly determination value MA (S130: NO), it is determined that there is no anomaly in the air flow meter 13 in step S150. Thereafter, the process of the current routine is ended.

Figure 8:
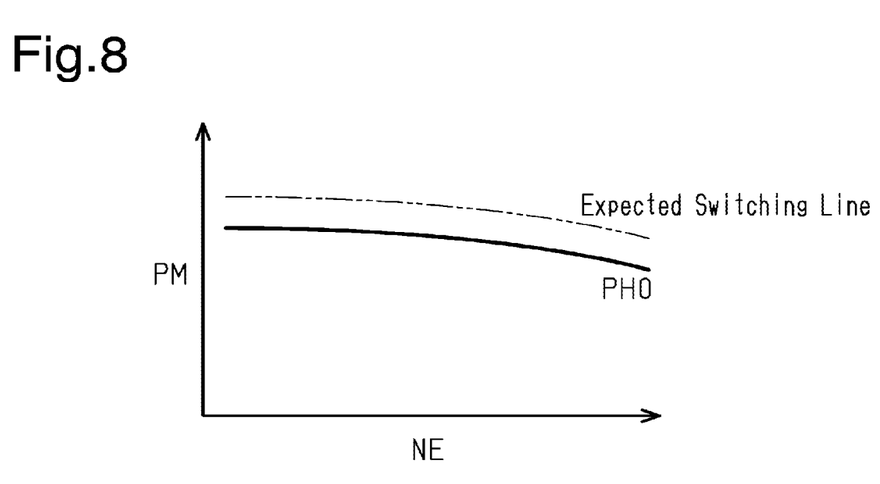
FIG. 8 is a graph showing the relationship between an engine rotation speed and a great pulsation region determination value calculated in the AFM anomaly diagnosis routine of FIG. 7.

FIG. 8 shows the relationship between the great pulsation region determination value PH0 and the engine rotation speed NE. In FIG. 8, the long dashed double-short dashed line represents an expected switching line. As shown in FIG. 8, the great pulsation region determination value PH0 is set to be lower than the expected switching line at any value of the engine rotation speed NE.

The expected switching line is acquired from the result of the measurement shown below. Under a standard environmental condition, in which the intake air temperature THA, the atmospheric pressure PA, and the coolant temperature THW each have a standard value, the throttle opening degree TA is gradually increased from the value at which the pulsation rate RTE, which is obtained from the detected value of the intake air flow rate GA, is less than the great pulsation determination value RO, while maintaining the engine rotation speed NE at a constant value. The intake pipe pressure PM when the pulsation rate RTE has reached the great pulsation determination value RO is measured. That is, the intake pipe pressure PM at the time when the intake air pulsation is determined to be great by the first determination process P3 is measured. In the following description, this measured value of the intake pipe pressure PM will be referred to as a switching pressure PMC. The switching pressure PMC is measured at different values of the engine rotation speed NE to obtain the switching pressure PMC at each value of the engine rotation speed NE of the engine that is the subject of the measurement. The same measurement is performed on multiple engines. The average values of the switching pressure PMC at each value of the engine rotation speed NE of the respective engines are plotted to obtain the expected switching line. That is, the expected switching line represents the operation line of a standard individual engine at which the calculation method of the intake air amount is switched between the mass flow method and the throttle speed method under a standard environmental condition.

The operation and advantages of the engine controller according to the present embodiment, which is configured in the above-described manner, will now be described.

The engine controller of the present embodiment determines whether there is an anomaly in the air flow meter 13 in step S130 of the AFM anomaly determination routine. That is, the engine controller determines that there is an anomaly in the air flow meter 13 when the difference between the first intake air amount calculated value MC1, which has been calculated by the first calculation process P1, and the second intake air amount calculated value MC2, which has been calculated by the second calculation process P2, is greater than or equal to the prescribed anomaly determination value MA. If there is an anomaly in the air flow meter 13, the first intake air amount calculated value MC1, which has been calculated by the first calculation process P1 based on the output of the air flow meter 13, is an inaccurate value. On the other hand, even if there is an anomaly in the air flow meter 13, the calculation result of the second intake air amount calculated value MC2 in the second calculation process P2 by the throttle speed method is not influenced. Thus, when there is an anomaly in the air flow meter 13, the difference between the first intake air amount calculated value MC1 and the second intake air amount calculated value MC2 is increased. Accordingly, it is possible to determine that there is an anomaly in the air flow meter 13 based on the fact that the difference between the intake air amount calculated values is great.

However, when the intake air pulsation is great, the first intake air amount calculated value MC1, which is calculated based on the output of the air flow meter 13, may be inaccurate. Thus, the anomaly diagnosis of the air flow meter 13 by using the output of the air flow meter 13 cannot be performed accurately when the intake air pulsation is great.

The determination as to whether the intake air pulsation is great can be performed by using the output of the air flow meter 13 as in the first determination process P3 of FIG. 2. However, if there is an anomaly in the air flow meter 13, the result of the pulsation determination by using the output of the air flow meter 13 is unreliable. Thus, the determination by using the air flow meter 13 is not suitable as the pulsation determination for the anomaly diagnosis of the air flow meter 13.

In this regard, in the present embodiment, if the intake pipe pressure PM is determined to be greater than or equal to the great pulsation region determination value PH0 in step S110, the anomaly determination of the air flow meter 13 in step S130 is not performed. As shown in FIG. 8, the region in which the intake pipe pressure PM is determined to be greater than or equal to the great pulsation region determination value PH0 in step S110 is included in the region in which the intake air pulsation is expected to be determined to be great by the first determination process P3, that is, the region on the greater pressure side of the expected switching line. Thus, in many cases, since the intake pipe pressure PM reaches or exceeds the great pulsation region determination value PH0 before the intake air pulsation is increased to a level that requires switching of the calculation method of the intake air amount from the mass flow method to the throttle speed method, the anomaly determination of the air flow meter 13 by using the output of the air flow meter 13 is prohibited.

Further, in the present embodiment, if the throttle opening degree TA is determined to be greater than or equal to the great opening degree determination value HI in step S120, the anomaly determination of the air flow meter 13 in step S130 is not performed. That is, the anomaly determination of the air flow meter 13 by using the air flow meter 13 is prohibited when the intake air pulsation is determined to be great by the second determination process P4.

As described above, in the present embodiment, the pulsation determination that determines whether the anomaly determination of the air flow meter 13 by using the air flow meter 13 should be performed is performed without using the air flow meter 13. Therefore, regardless whether there is an anomaly in the air flow meter 13, the anomaly determination is not performed when the intake air pulsation is great.

In the present embodiment, the process of step S130 of the AFM anomaly diagnosis routine corresponds to the anomaly determination process that determines whether there is an anomaly in an air flow meter by using the output of the air flow meter.

The above-described embodiments may be modified as follows. The above-described embodiments and the following modifications can be combined as long as the combined modifications remain technically consistent with each other.

In the fourth embodiment, the anomaly determination process is performed based on the difference between the first intake air amount calculated value MC1 and the second intake air amount calculated value MC2. In place of this configuration, whether there is an anomaly in the air flow meter 13 can be determined by monitoring the output of the air flow meter 13. That is, the anomaly determination process may be performed in a manner different from the ones described above based on the output of the air flow meter 13. For example, an estimated value of the intake air flow rate GA may be obtained based on the throttle opening degree TA or the intake pipe pressure PM, and the engine rotation speed NE, and the anomaly determination process may be performed by determining that there is an anomaly in the air flow meter 13 when the difference between the estimated value and the detected value of the air flow meter 13 is great.

The process of step S110 in the AFM anomaly determination routine in the fourth embodiment may be omitted. In this case also, the anomaly determination process is preferably performed after the process of step S120 is performed. In other words, the anomaly determination process is preferably performed on condition that the throttle opening degree TA is less than the great opening degree determination value HI, that is, on condition that the intake air pulsation has not been determined to be great by the second determination process P4. If the process of step S120 of the AFM anomaly diagnosis routine is changed to that shown below, the switching of the calculation method of the intake air amount used to determine the instructed injection amount Q can be used for the anomaly diagnosis of the air flow meter 13 in the engine controller performed according to the second and third embodiments. That is, the process of step S120 may be replaced by a step in which an affirmative determination is made (S120: YES) when the second determination process P11 or the second determination process P21 determines that the intake air pulsation is great, and a negative determination is made when the second determination process P11 or the second determination process P21 has not determined that the intake air pulsation is great.

The second calculation process P2 of each of the above-described embodiments calculates the intake air amount by the throttle speed method. However, the intake air amount may be calculated by the speed density method based on the detected value of the intake pipe pressure PM. Even in such a case, the second calculation process P2 calculates the intake air amount without the output of the air flow meter 13. Thus, if the calculated value of the intake air amount of the second calculation process P2 is used as the calculated value of the intake air amount used to determine the instructed injection amount Q of the injector 18 at the time when the intake air pulsation is great, reduction in the control accuracy of the fuel injection amount due to an increase in the intake air pulsation is limited.

In each of the above-described embodiments, the calculation method switching process P5 selects one of the first intake air amount calculated value MC1 and the second intake air amount calculated value MC2 as the calculated value of the intake air amount, and the selected calculated value is used to determine the instructed injection amount Q of the injector 18. The calculated value of the intake air amount selected by the calculation method switching process P5 may be used to determine the operation amount of an actuator provided in the engine 10 other than the injector 18. The operation amount of the actuator may be an instructed value of the throttle opening degree TA delivered to the throttle motor 15 or an instructed value of the ignition timing delivered to the ignition device 21. In addition, the operation amount of the actuator may be an instructed value of the valve timing delivered to the variable valve timing mechanism, an instructed value of the recirculated amount of exhaust gas delivered to the EGR device, or an instructed value of the released amount of fuel vapor delivered to the vapor purge mechanism.

The electronic control unit 26 is not limited to a device that includes the arithmetic processing circuit 27 and the memory 28 and executes various types of software processing. For example, at least part of the processes executed by the software in the above-described embodiments may be executed by hardware circuits dedicated to executing these processes (such as ASIC). That is, the electronic control unit 26 may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing devices each including a processor and a program storage device and a plurality of dedicated hardware circuits may be provided.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine controller that controls an operating state of an engine through operation of an actuator provided to the engine, the engine controller is configured to perform:
 a first calculation process that calculates a first intake air amount introduced into a cylinder of the engine, the first calculation process calculating the first intake air amount based on an output of an air flow meter that detects an intake air flow rate in an intake passage of the engine;
 a second calculation process that calculates a second intake air amount introduced into the cylinder of the engine based on at least one of a detected value of an intake pipe pressure and a throttle opening degree, without using the output of the air flow meter;
 a first determination process that determines whether an intake air pulsation in the intake passage is great based on the output of the air flow meter;
 a second determination process that determines whether the intake air pulsation in the intake passage is great based on at least one of the detected value of the intake pipe pressure and the throttle opening degree, without using the output of the air flow meter; and
 a calculation method switching process, wherein
  when the intake air pulsation is not determined to be great by both of the first determination process and the second determination process, the calculation method switching process selects the first intake air amount to determine an operation amount of the actuator, and when the intake air pulsation is determined to be great by at least one of the first determination process and the second determination process, the calculation method switching process selects the second intake air amount to determine the operation amount of the actuator, wherein when the intake air pulsation is not determined to be great by the first determination process and the intake air pulsation is determined to be great by the second determination process, the calculation method switching process selects the second intake air amount.

2. The engine controller according to claim 1, wherein the second determination process determines that the intake air pulsation is great on a condition that the throttle opening degree is greater than or equal to a great opening degree determination value that is set based on an engine rotation speed.

3. The engine controller according to claim 1, wherein the second determination process determines that the intake air pulsation is great on a condition that the intake pipe pressure is greater than or equal to a great pulsation region determination value that is set based on an engine rotation speed.

4. The engine controller according to claim 1, wherein the second determination process determines that the intake air pulsation is great based on a fact that fluctuation of the detected value of the intake pipe pressure is great.

5. The engine controller according to claim 1, being configured to perform an anomaly determination process on a condition that the second determination process has not determined that the intake air pulsation is great, wherein the anomaly determination process determines whether there is an anomaly in the air flow meter by using the output of the air flow meter.

6. The engine controller according to claim 5, wherein the anomaly determination process determines presence of the anomaly in the air flow meter based on fact that a difference between the first intake air amount calculated by the first calculation process and the second intake air amount calculated by the second calculation process is great.

7. An engine control method that controls an operating state of an engine through operation of an actuator provided to the engine, the engine control method comprising:

calculating a first intake air amount introduced into a cylinder of the engine based on an output of an air flow meter that detects an intake air flow rate in an intake passage of the engine;

calculating a second intake air amount introduced into the cylinder of the engine based on at least one of a detected value of an intake pipe pressure and a throttle opening degree, without using the output of the air flow meter;

determining that an intake air pulsation in the intake passage is not great based on the output of the air flow meter;

determining that the intake air pulsation in the intake passage is great based on at least one of the detected value of the intake pipe pressure and the throttle opening degree, without using the output of the air flow meter; and selecting the second intake air amount to determine the operation amount of the actuator when the intake air pulsation is determined to be not great is based on the output of the air flow meter and the intake air pulsation is determined to be great based on at least one of the intake pipe pressure and the throttle opening degree, without using the output of the air flow meter.

8. A non-transitory computer readable memory medium that stores a program that causes a processor to execute an engine control process, the engine control process controlling an operating state of an engine through operation of an actuator provided to the engine, the engine control process including:

calculating a first intake air amount introduced into a cylinder of the engine based on an output of an air flow meter that detects an intake air flow rate in an intake passage of the engine;

calculating a second intake air amount into the cylinder of the engine based on at least one of a detected value of an intake pipe pressure and a throttle opening degree, without using the output of the air flow meter;

determining that an intake air pulsation in the intake passage is not great based on the output of the air flow meter;

determining that the intake air pulsation in the intake passage is great based on at least one of the detected value of the intake pipe pressure and the throttle opening degree, without using the output of the air flow meter; and selecting the second intake air amount to determine the operation amount of the actuator when the intake air pulsation is determined to be not great based on the output of the air flow meter and the intake air pulsation is determined to be great based on at least one of the intake pipe pressure and the throttle opening degree, without using the output of the air flow meter.

* * * * *